US012761014B2

(12) United States Patent
Higuchi et al.

(10) Patent No.: US 12,761,014 B2
(45) Date of Patent: Oct. 13, 2026

(54) PATTERN MEASUREMENT DEVICE, PATTERN MEASUREMENT PROGRAM, AND PATTERN MEASUREMENT METHOD

(71) Applicant: HORIBA STEC, Co., Ltd., Kyoto (JP)

(72) Inventors: Seiji Higuchi, Kyoto (JP); Ryosuke Ogaki, Kyoto (JP); Takayuki Ueda, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 92 days.

(21) Appl. No.: 18/899,560

(22) Filed: Sep. 27, 2024

(65) Prior Publication Data

US 2025/0109936 A1 Apr. 3, 2025

(30) Foreign Application Priority Data

Sep. 29, 2023 (JP) ................................ 2023-170150

(51) Int. Cl.
*G01N 11/14* (2006.01)
*G01B 11/14* (2006.01)

(52) U.S. Cl.
CPC .................................... *G01B 11/14* (2013.01)

(58) Field of Classification Search
CPC ........ G01B 11/14; G01B 21/02; G01B 15/00; G01B 15/04; G01B 2210/56; G01N 2223/418; G01N 2223/6116; G01N 23/2251
See application file for complete search history.

(56) References Cited

U.S. PATENT DOCUMENTS

| | | | | |
|---|---|---|---|---|
| 11,562,551 | B1 * | 1/2023 | Oertel | G06K 7/1413 |
| 2006/0255010 | A1 * | 11/2006 | Behm | H01J 37/32082 216/41 |
| 2010/0287153 | A1 * | 11/2010 | Macgregor | G06F 18/2433 707/707 |
| 2011/0071782 | A1 * | 3/2011 | Nahar | G01R 31/31718 702/179 |
| 2016/0313266 | A1 * | 10/2016 | Sugiyama | G01N 23/2206 |
| 2016/0372303 | A1 * | 12/2016 | Park | G03F 7/70625 |
| 2017/0372489 | A1 * | 12/2017 | Tabuchi | G06T 7/62 |
| 2021/0158215 | A1 * | 5/2021 | Seidel | G06N 20/00 |
| 2022/0036235 | A1 * | 2/2022 | Jinguu | G06N 20/00 |
| 2022/0392793 | A1 * | 12/2022 | Buxbaum | H01J 37/265 |

FOREIGN PATENT DOCUMENTS

JP 2017067443 A 4/2017

* cited by examiner

*Primary Examiner* — Sang H Nguyen
(74) *Attorney, Agent, or Firm* — Alleman Hall LLP

(57) ABSTRACT

The present invention is to accurately measure a dimension of a pattern by using statistical outlier processing, and is a pattern measurement device for measuring a dimension of a pattern formed on a sample. The pattern measurement device includes: a dimension measurement unit configured to measure a dimension of the pattern; an outlier removal unit configured to execute outlier processing at least twice on a plurality of dimension values measured by the dimension measurement unit; and a representative value determination unit configured to obtain a representative dimension value of the pattern from one or a plurality of the dimension values from which an outlier has been removed by the outlier removal unit.

9 Claims, 4 Drawing Sheets

RAW DATA OF DIMENSION VALUE DISTRIBUTION

DATA SUBJECTED TO OUTLIER PROCESSING OF FIRST TIME IN DIMENSION VALUE DISTRIBUTION

DATA SUBJECTED TO OUTLIER PROCESSING OF SECOND TIME IN DIMENSION VALUE DISTRIBUTION

PATTERN MEASUREMENT DEVICE, PATTERN MEASUREMENT PROGRAM, AND PATTERN MEASUREMENT METHOD

CROSS-REFERENCE TO RELATED APPLICATION

The present application claims priority to Japanese Patent Application No. 2023-170150 filed Sep. 29, 2023, entitled "PATTERN MEASUREMENT DEVICE, PATTERN MEASUREMENT PROGRAM, AND PATTERN MEASUREMENT METHOD" which is incorporated herein by reference in its entirety.

BACKGROUND OF THE INVENTION

1. Technical Field

The present invention relates to a pattern measurement device, a pattern measurement program, and a pattern measurement method.

2. Description of the Related Art

In recent years, in a field of semiconductor manufacturing, research on a microfabrication technology for forming a pattern by using a directed self-assembly lithography method (DSA method) has been advanced.

Technology described in JP 2017-67443 A is considered to evaluate a formed pattern. A pattern measurement device of JP 2017-67443 A obtains a distance between centers of holes or dots adjacent to each other in a captured image of a pattern (for example, a hole pattern or a dot pattern) formed by the DSA method, and sets an addition average value of the obtained distance between centers as a reference value of the distance between centers.

However, since image processing is performed on the captured image to obtain the distance between centers, for example, an outlier due to incorrect image processing is included, and it is not possible to accurately obtain the distance between centers. In addition, in the formation of the pattern by the DSA method, for example, an outlier is included also when a defect such as collapse of a periodic structure occurs, and it is not possible to accurately obtain the distance between centers.

PRIOR ART DOCUMENT

Patent Document

Patent Document 1: JP 2017-67443 A

SUMMARY OF THE INVENTION

Therefore, the present invention has been made to solve the above-described problem, and an object thereof is to accurately measure a dimension of a pattern by using statistical outlier processing.

That is, a pattern measurement device according to the present invention is a pattern measurement device for measuring a dimension of a pattern formed on a sample, and the pattern measurement device includes: a dimension measurement unit configured to measure a dimension of the pattern; an outlier removal unit configured to execute statistical outlier processing at least twice on a plurality of dimension values measured by the dimension measurement unit; and a representative value determination unit configured to obtain a representative dimension value of the pattern from one or a plurality of the dimension values from which an outlier has been removed by the outlier removal unit.

In such a pattern measurement device, since the statistical outlier processing is executed at least twice on the plurality of dimension values measured by the dimension measurement unit, it is possible to suitably remove an outlier due to a measurement error of the dimension measurement unit, an outlier due to a structure of the pattern, and the like, and it is possible to accurately obtain a representative dimension value of the pattern. In addition, since an outlier is removed from a plurality of the dimension values by the statistical outlier processing, reliability or objectivity of the obtained representative dimension value can be secured.

As a specific embodiment of the statistical outlier processing, the outlier removal unit desirably executes, at least twice as the outlier processing, processing of setting a value out of a quartile range as an outlier on a plurality of the dimension values. Here, the value out of the quartile range is a value smaller than 1.5 times the "first quartile-quartile range" and a value larger than 1.5 times the "third quartile+quartile range". Note that 1.5 times can be changed.

As a specific embodiment of the statistical outlier processing, it is desirable that the outlier removal unit mainly remove an outlier due to a measurement error of the dimension measurement unit in the outlier processing of first time, and mainly remove an outlier due to a structure of the pattern in the outlier processing of second time.

As a specific embodiment of the dimension measurement unit, the dimension measurement unit desirably measures a dimension value of the pattern by performing image recognition on a captured image of the sample.

The dimension measurement unit desirably measures a dimension value of the pattern included in the entire captured image or 90% or more of the captured image.

With this configuration, the number of pieces of data of the dimension values of the pattern can be increased, and reliability or objectivity of a representative dimension value obtained on the basis of these dimension values can be improved.

As a specific embodiment of obtaining the representative dimension value, the representative value determination unit desirably adds and averages a plurality of the dimension values from which an outlier has been removed, to obtain the representative dimension value.

The pattern measurement device of the present invention desirably measures a dimension of a pattern formed by directed self-assembly of a polymer.

Further, it is preferable that the pattern is formed by periodically forming a plurality of holes or dots, and the dimension measurement unit measures a distance between centers of the holes or the dots adjacent to each other or a diameter of the holes or the dots.

A pattern measurement program according to the present invention is a pattern measurement program for measuring a dimension of a pattern formed on a sample, and the pattern measurement program causes a computer to have: a function as a dimension measurement unit configured to measure a dimension of the pattern; a function as an outlier removal unit configured to execute statistical outlier processing at least twice on a plurality of dimension values measured by the dimension measurement unit; and a function as a representative value determination unit configured to obtain a representative dimension value of the pattern from one or a plurality of the dimension values from which an outlier has been removed by the outlier removal unit.

Furthermore, a pattern measurement method according to the present invention is a pattern measurement method for measuring a dimension of a pattern formed on a sample, and includes: measuring a dimension of the pattern; executing statistical outlier processing at least twice on a plurality of measured dimension values; and obtaining a representative dimension value of the pattern from one or a plurality of the dimension values from which an outlier has been removed.

As described above, according to the present invention, a dimension of a pattern can be accurately measured using statistical outlier processing.

DETAILED DESCRIPTION

Figure 1:
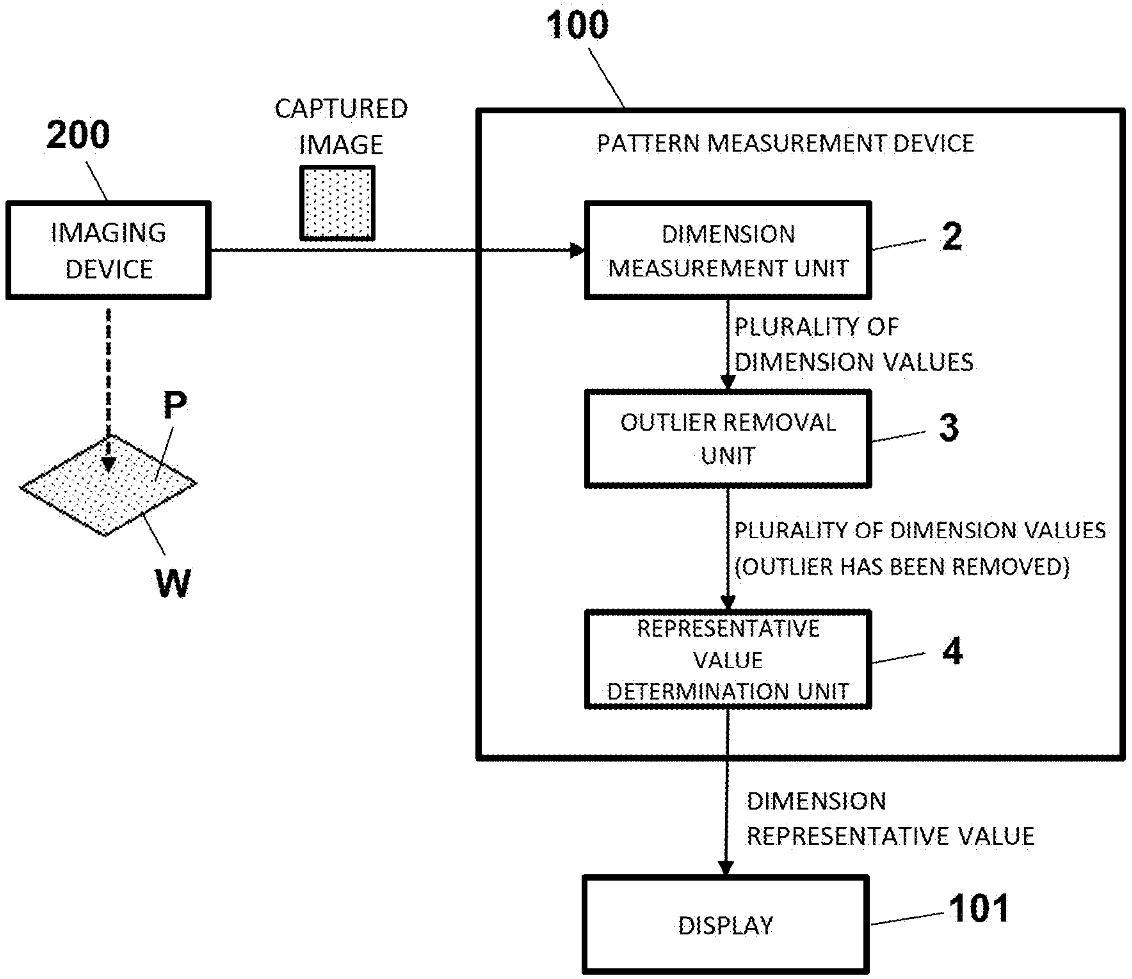
FIG. 1 is a schematic diagram illustrating a configuration of a pattern measurement device according to an embodiment of the present invention.

Hereinafter, an embodiment of a pattern measurement device according to the present invention will be described with reference to the drawings.

Note that any of the drawings shown below is schematically drawn with appropriate omission or exaggeration for easy understanding. The same components are denoted by the same reference numerals, and a description thereof will be omitted as appropriate.

<Configuration of Pattern Measurement Device 100>

A pattern measurement device 100 according to the present embodiment measures a dimension of a pattern formed using directed self-assembly of a polymer by a directed self-assembly lithography method (DSA method), for example. Here, examples of the formed pattern include a hole pattern in which a plurality of holes are periodically formed, and a dot pattern in which a plurality of dots are periodically formed.

Specifically, as illustrated in FIG. 1, the pattern measurement device 100 includes a dimension measurement unit 2 configured to measure a dimension of a pattern, an outlier removal unit 3 configured to execute statistical outlier processing on a plurality of dimension values L measured by the dimension measurement unit 2, and a representative value determination unit 4 configured to obtain a representative dimension value $L_0$ of the pattern from a plurality of the dimension values L from which an outlier has been removed by the outlier removal unit 3.

Note that the dimension measurement unit 2, the outlier removal unit 3, and the representative value determination unit 4 of the present embodiment is configured by a computer having a CPU, a memory, an input/output interface, an AD converter, an output unit such as a display 101, an input means such as a keyboard, and the like, and functions thereof are exerted by cooperation of the CPU and peripheral devices on the basis of a pattern measurement program stored in the memory. Note that the functions of the dimension measurement unit 2, the outlier removal unit 3, and the representative value determination unit 4 may be exerted by different computers.

Hereinafter, each of the units 2 to 4 will be described in detail.

The dimension measurement unit 2 measures a dimension value of a plurality of patterns (holes or dots) by performing image recognition on a captured image of a sample W. The dimension measurement unit 2 of the present embodiment measures a distance L between centers (see FIGS. 2A and 2B) of the plurality of patterns (holes or dots). Note that the captured image is captured by an imaging device 200 such as a scanning electron microscope, for example.

Specifically, the dimension measurement unit 2 extracts centers of the plurality of patterns (holes or dots) included in the entire captured image. Here, as illustrated in FIGS. 2A and 2B, the dimension measurement unit 2 detects an outline of each of the plurality of patterns (holes or dots), and extracts center coordinates of a circumscribed circle or an inscribed circle of the outline.

Then, the dimension measurement unit 2 obtains a distance (distance L between centers) between each extracted center and three adjacent centers, for example. Note that the dimension measurement unit 2 may obtain a distance (distance L between centers) between each extracted center and one or more adjacent centers, for example.

Figure 2B:
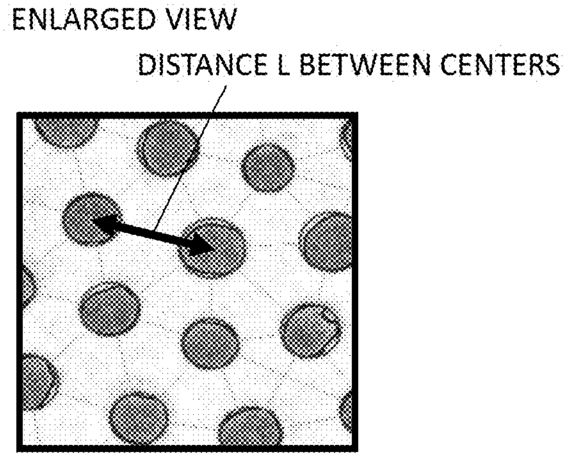
FIG. 2B is an enlarged view.
Figure 2A:
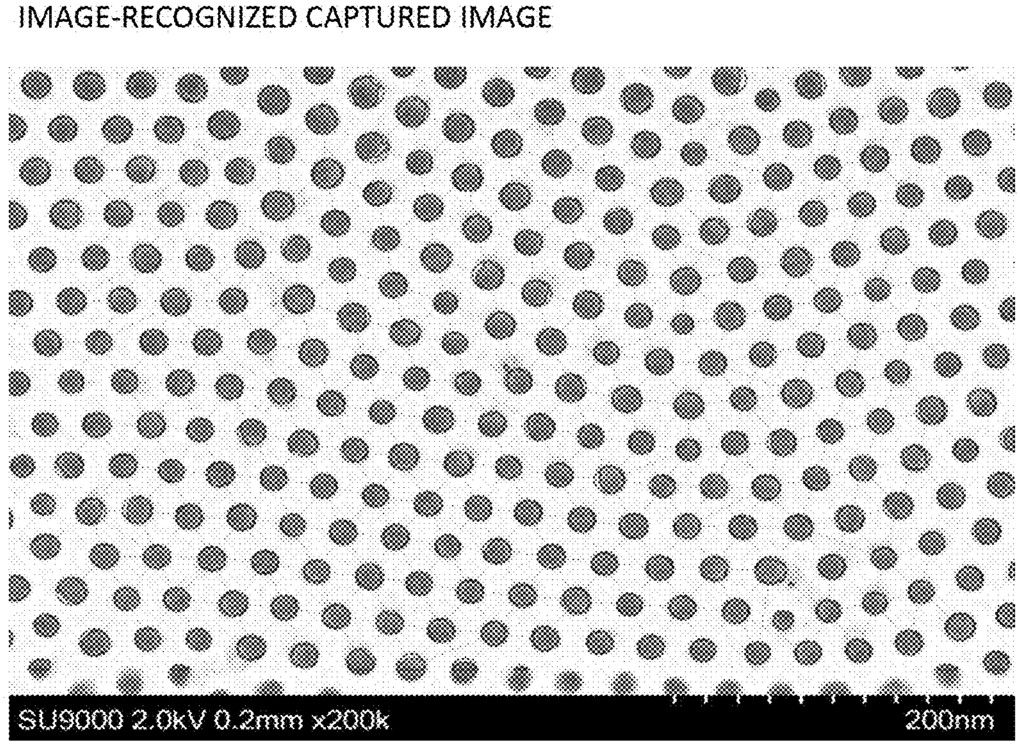
FIG. 2A is a view illustrating an image-recognized captured image of a pattern of the embodiment.

In the pattern illustrated in FIGS. 2A and 2B, holes or dots are formed in a substantially hexagonal close-packed lattice shape, and a distance (distance L between centers) between with six adjacent centers may be obtained. However, in a case where the pattern structure is inconsistent and noise increases when a distance (distance L between centers) between with six centers is obtained, it is conceivable to obtain a distance (distance L between centers) between with five or less adjacent centers for each extracted center.

The outlier removal unit 3 executes the statistical outlier processing on a plurality of the dimension values L measured by the dimension measurement unit 2. In the outlier processing of the present embodiment, a value out of the quartile range is set as an outlier for a plurality of the dimension values L. Here, the value out of the quartile range is a value smaller than 1.5 times the "first quartile-quartile range" and a value larger than 1.5 times the "third quartile+quartile range". Note that 1.5 times can be changed.

Specifically, the outlier removal unit 3 executes the statistical outlier processing at least twice. It is advantageous to perform the outlier processing on a dimension value of a pattern formed by the DSA method as in the present embodiment. That is, since the pattern is formed by the DSA method, there are a portion in which the periodic structure is inconsistent and a portion in which a hole does not occur cleanly. By removing the dimension value L of such a portion as an outlier, it is possible to accurately and easily obtain a representative dimension value $L_0$ that is likely to be accurate, that is, $L_0$ of a case where the production reaction is successfully performed.

Figure 3A:
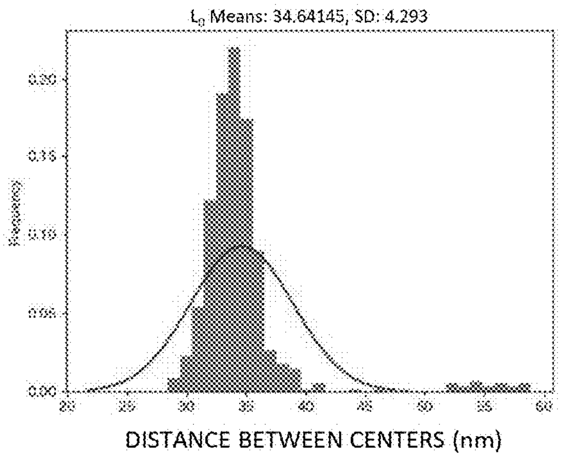
FIG. 3A is raw data of a dimension value distribution.
Figure 3B:
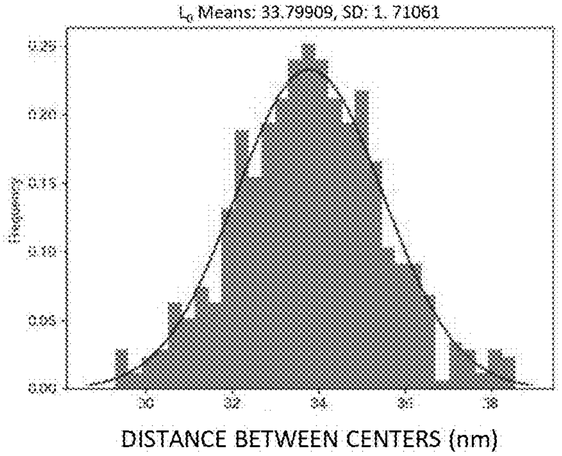
FIG. 3B is data subjected to outlier processing of first time in the dimension value distribution.
Figure 3C:
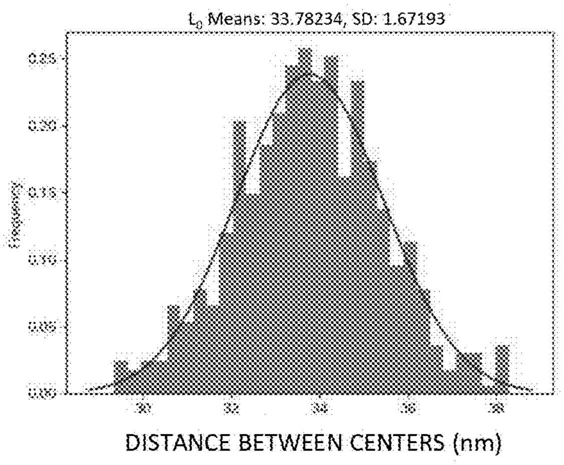
FIG. 3C is data subjected to outlier processing of second time in the dimension value distribution, according to the embodiment.
Figure 4:
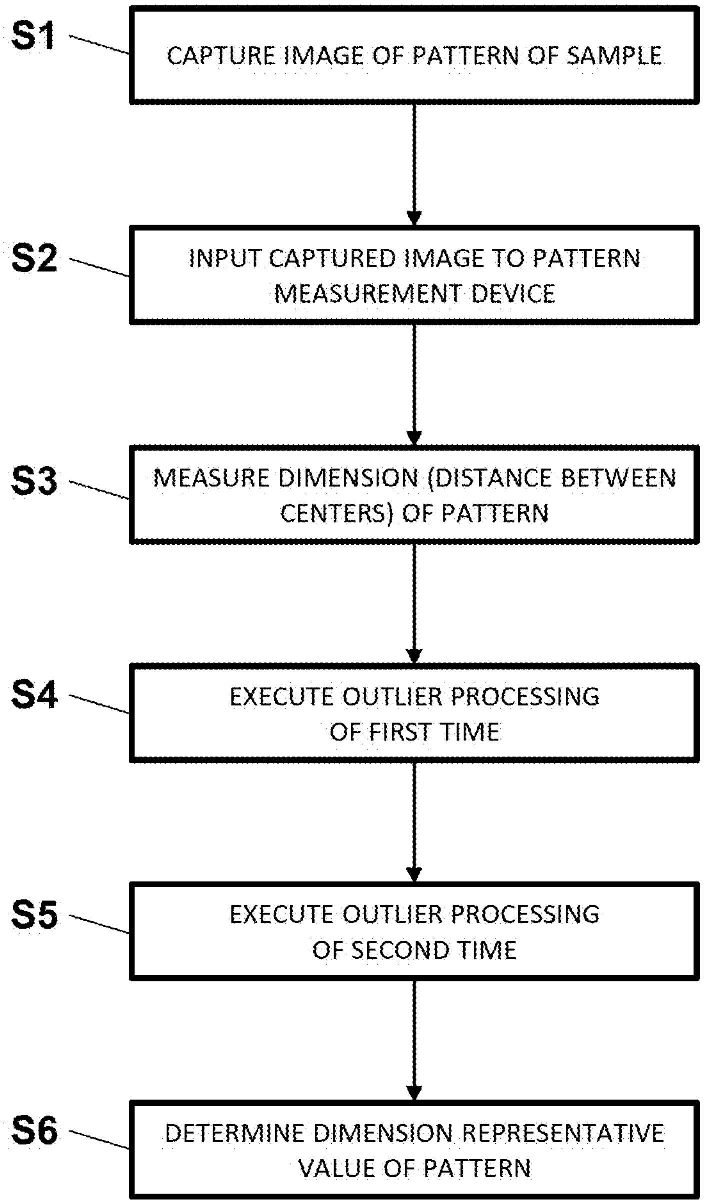
FIG. 4 is a flowchart of a pattern measurement method according to the embodiment.

Here, the outlier removal unit 3 performs the outlier processing of first time on a plurality of the dimension values L measured by the dimension measurement unit 2 (see FIG. 3B). In addition, the outlier removal unit 3 performs the outlier processing of second time on a plurality of the dimension values L from which an outlier has been removed by the outlier processing of first time (see FIG. 3C). In the outlier processing of first time, an outlier due to a measurement error of the dimension measurement unit 2 is mainly removed. In addition, in the outlier processing of second time, an outlier due to the structure of the pattern is mainly removed.

The representative value determination unit 4 obtains the representative dimension value $L_0$ of the pattern from a plurality of the dimension values L from which an outlier has been removed by the outlier removal unit 3. Specifically, the representative value determination unit 4 adds and averages a plurality of the dimension values L from which an outlier has been removed by the above-described two times of outlier processing, to obtain the representative dimension value $L_0$.

In the present embodiment, the distance L between centers obtained by the dimension measurement unit 2 from the captured image is the number of pixels. Then, the representative value determination unit 4 calculates an actual distance (nm) between centers as the representative dimension value $L_0$ by adding and averaging a plurality of the dimension values L from which an outlier has been removed, and multiplying an average value by a conversion value per pixel. Here, as the conversion value per pixel, nm per pixel is acquired from a scale displayed on the captured image. Specifically, coordinates of the entire scale are acquired by image recognition of the vertically long rectangle. The number of pixels from a right end coordinate to a left end coordinate of the scale is acquired, and a value obtained by dividing a scale size (for example, 500 nm) by the acquired value is set as the conversion value. Note that the scale size may be acquired by image recognition.

<Pattern Measurement Method>

First, the sample W on which a pattern P is formed by the DSA method is imaged by the imaging device 200 such as a scanning electron microscope (step S1). Then, the captured image is input to the pattern measurement device 100 (step S2).

The input captured image is subjected to image recognition by the dimension measurement unit 2, and a dimension (distance L between centers) of a plurality of patterns (holes or dots) is measured (step S3).

Then, the plurality of dimension values L measured by the dimension measurement unit 2 are input to the outlier removal unit 3. Then, the outlier removal unit 3 executes the outlier processing of first time on a plurality of the dimension values L (step S4), and executes the outlier processing of second time on a plurality of the dimension values L from which an outlier has been removed in the outlier processing of first time (step S5).

The plurality of dimension values L for which the above-described two times of outlier processing has been executed are input to the representative value determination unit 4. The representative value determination unit 4 uses a plurality of the dimension values L from which an outlier has been removed, to determine the representative dimension value $L_0$ of the dimension (distance L between centers) of the plurality of patterns (holes or dots) (step S6).

Note that the captured image, the image-recognized captured image (such as an image in which a circumscribed circle or an inscribed circle is recognized), the determined representative dimension value $L_0$, and the like can be displayed on the display 101 or the like of the pattern measurement device 100.

Effects of Present Embodiment

As described above, according to the pattern measurement device 100 of the present embodiment, since the statistical outlier processing is executed at least twice on a plurality of the dimension values L measured by the dimension measurement unit 2, an outlier due to a measurement error of the dimension measurement unit 2, an outlier due to a structure of the pattern, and the like can be suitably removed, and the representative dimension value $L_0$ of the pattern P can be accurately obtained. In addition, since an outlier is removed from a plurality of the dimension values L by executing the statistical outlier processing, reliability or objectivity of the obtained representative dimension value $L_0$ can be secured.

Other Embodiments

In the above embodiment, the distance L between centers is obtained as a dimension of the pattern P, but other dimensions may be obtained. For example, since the dimension measurement unit 2 obtains a circumscribed circle or an inscribed circle of a pattern (hole or dot), a radius of the pattern (hole or dot) may be measured from the circumscribed circle, the inscribed circle, or a circle between the circumscribed circle and the inscribed circle. In this case, the representative value determination unit 4 determines a representative value of the radius of the pattern (hole or dot) from the plurality of dimension values from which an outlier has been removed by the outlier removal unit 3. In addition, both the distance L between centers and the radius of the pattern P may be measured as a dimension of the pattern P, and both the representative dimension value $L_0$ and the representative value of the radius may be determined.

In addition, the outlier removal unit 3 of the above embodiment executes the outlier processing twice, but may execute the outlier processing three or more times.

Further, the outlier removal unit 3 of the above embodiment performs the same outlier processing twice, but the outlier processing of first time and the outlier processing of second time may be different.

In addition, in the above embodiment, a dimension of the pattern P formed by the DSA method is measured, but a dimension of other pattern P may be measured.

In the above embodiment, the dimension measurement unit 2 measures a dimension of the pattern P on a pixel basis, but may convert an actual dimension value by using a nm conversion value of a pixel value. In this case, the representative value determination unit 4 does not need to convert the nm conversion value into an actual dimension value.

In addition, various modifications and combinations of the embodiment may be made without departing from the gist of the present invention.

100 pattern measurement device
W sample
P pattern
2 dimension measurement unit
3 outlier removal unit
4 representative value determination unit

What is claimed is:

1. A pattern measurement device for measuring a dimension of a pattern formed on a sample, the pattern measurement device comprising a processor configured to:

measure a dimension of the pattern;

execute statistical outlier processing at least twice on a plurality of measured dimension values, the statistical outlier processing including processing of a first time that mainly removes an outlier due to a measurement error and processing of a second time that mainly removes an outlier due to a structure of the pattern; and obtain a representative dimension value of the pattern from one or a plurality of the dimension values from which an outlier has been removed, wherein the pattern is a directed self-assembly (DSA) pattern formed on a semiconductor sample.

2. The pattern measurement device according to claim 1, wherein the processor executes, at least twice as the statistical outlier processing, processing of setting a value out of a quartile range as an outlier for the plurality of dimension values.

3. The pattern measurement device according to claim 1, wherein the processor measures a dimension value of the pattern by performing image recognition on a captured image of the sample.

4. The pattern measurement device according to claim 3, wherein the processor measures a dimension value of the pattern included in an entire captured image or 90% or more of the captured image.

5. The pattern measurement device according to claim 1, wherein the processor adds and averages a plurality of the dimension values from which an outlier has been removed, to obtain the representative dimension value.

6. The pattern measurement device according to claim 1, wherein the pattern is formed by directed self-assembly of a polymer.

7. The pattern measurement device according to claim 1, wherein the pattern is formed by periodically forming a plurality of holes or dots, and the dimension includes a distance between centers of the holes or the dots adjacent to each other or a diameter of the holes or the dots.

8. A non-transitory storage medium storing a pattern measurement program for measuring a dimension of a pattern formed on a sample, the pattern measurement program executable by a computer to:

measure a dimension of the pattern;

execute statistical outlier processing at least twice on a plurality of dimension values measured by the computer, the statistical outlier processing including processing of a first time that mainly removes an outlier due to a measurement error and processing of a second time that mainly removes an outlier due to a structure of the pattern; and obtain a representative dimension value of the pattern from one or a plurality of the dimension values from which an outlier has been removed by the computer, wherein the pattern is a directed self-assembly (DSA) pattern formed on a semiconductor sample.

9. A pattern measurement method for measuring a dimension of a pattern formed on a sample, the pattern measurement method comprising:

measuring a dimension of the pattern;

executing statistical outlier processing at least twice on a plurality of measured dimension values, the statistical outlier processing including processing of a first time that mainly removes an outlier due to a measurement error and processing of a second time that mainly removes an outlier due to a structure of the pattern; and obtaining a representative dimension value of the pattern from one or a plurality of the dimension values from which an outlier has been removed, wherein the pattern is a directed self-assembly (DSA) pattern formed on a semiconductor sample.

* * * * *